Feb. 24, 1948.  I. D. THORNBURGH  2,436,409
MACHINE FOR MAKING CAN BODIES FROM FLATTENED TUBING
Filed Dec. 3, 1943  5 Sheets-Sheet 1

INVENTOR.
Ivan D. Thornburgh
BY Ivan D. Thornburgh
Charles H. Erne
ATTORNEYS

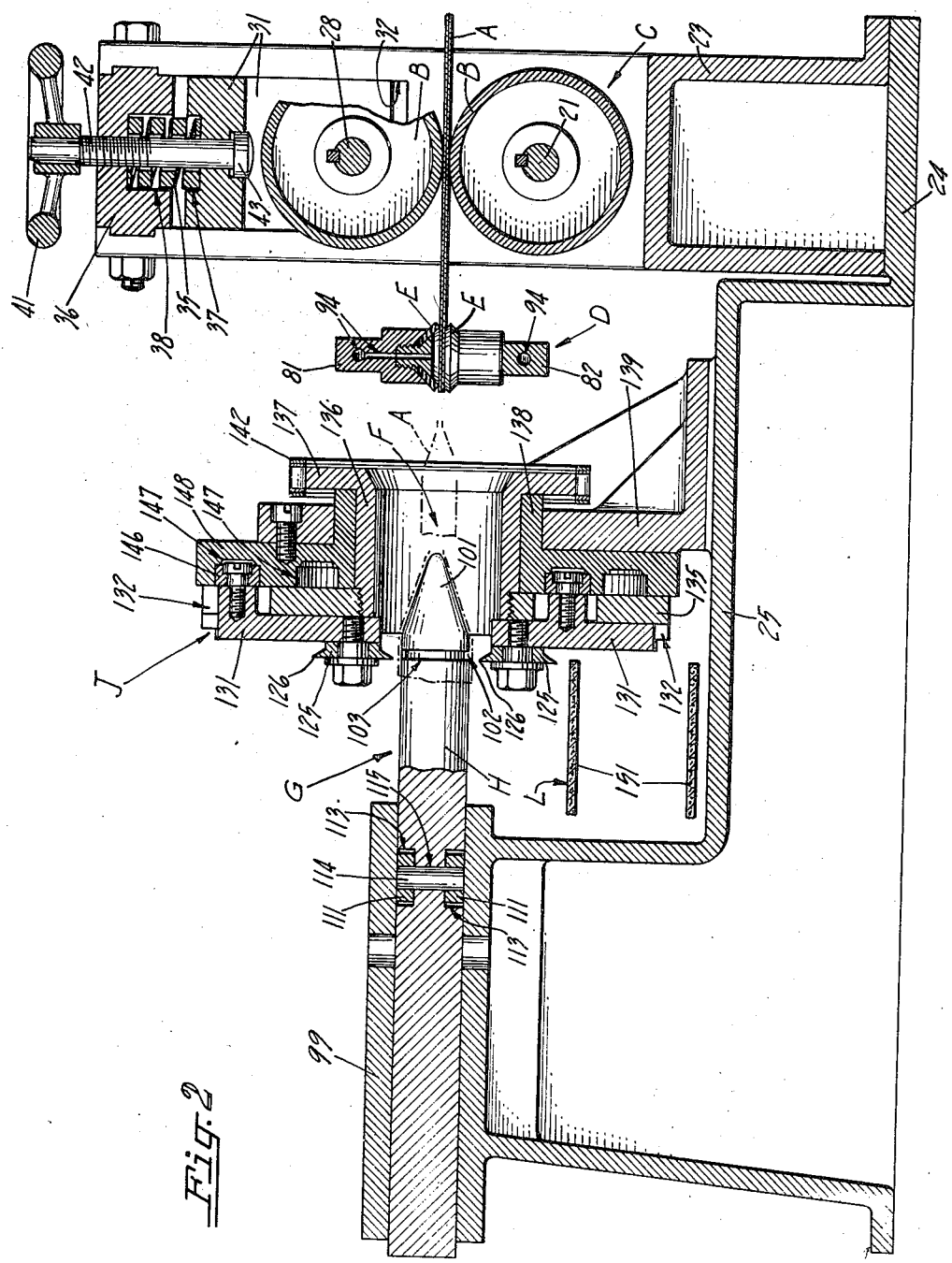

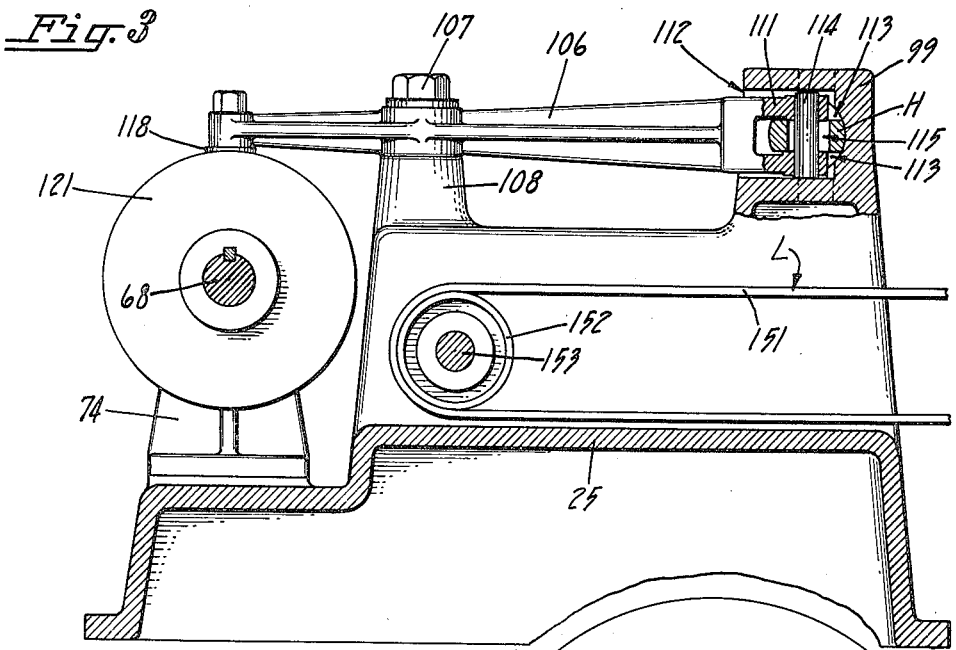
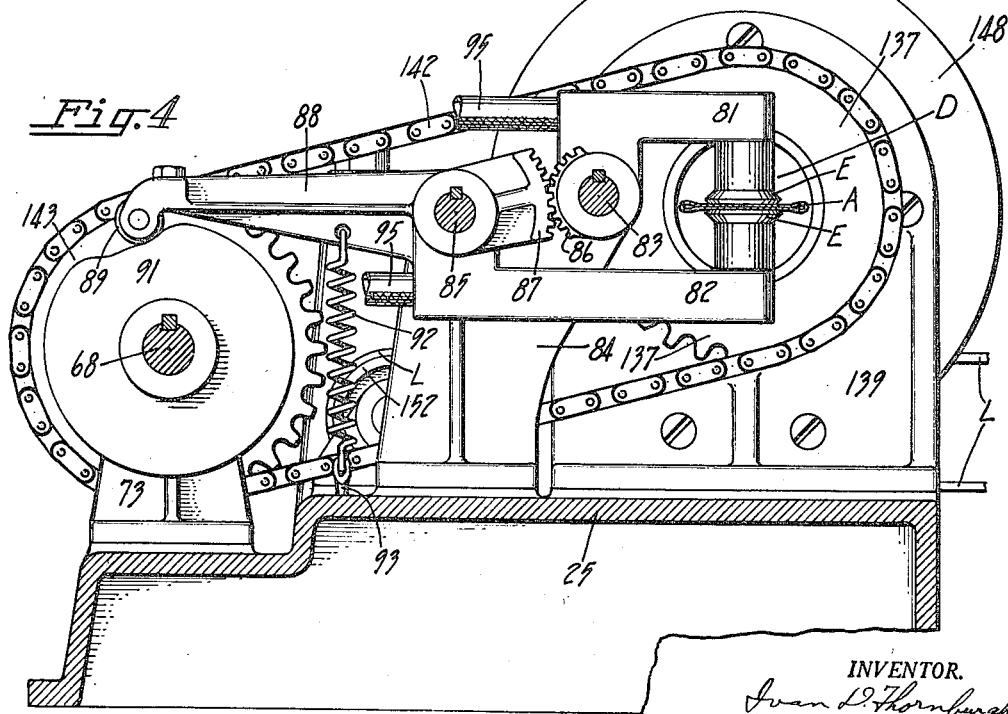

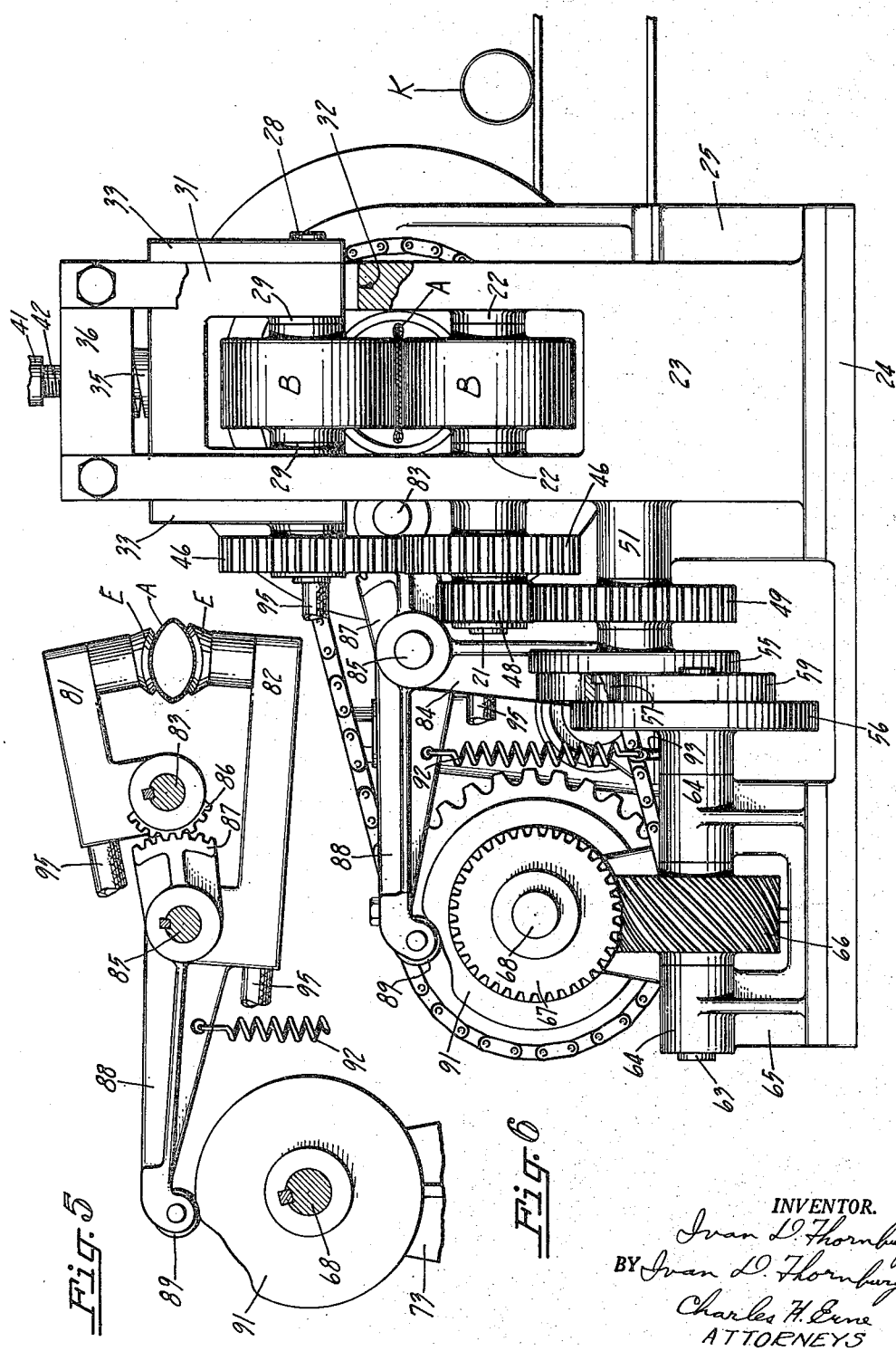

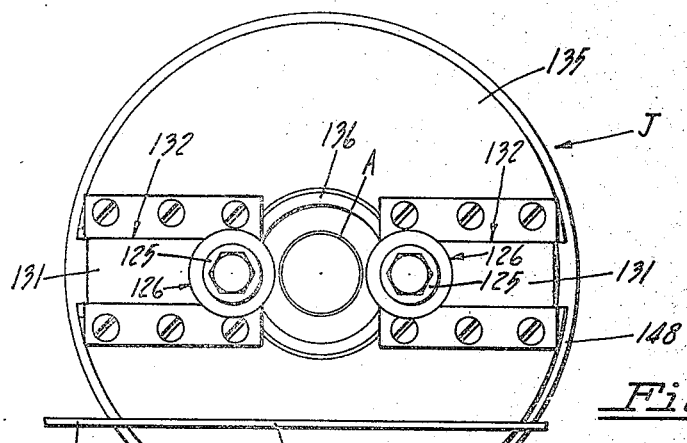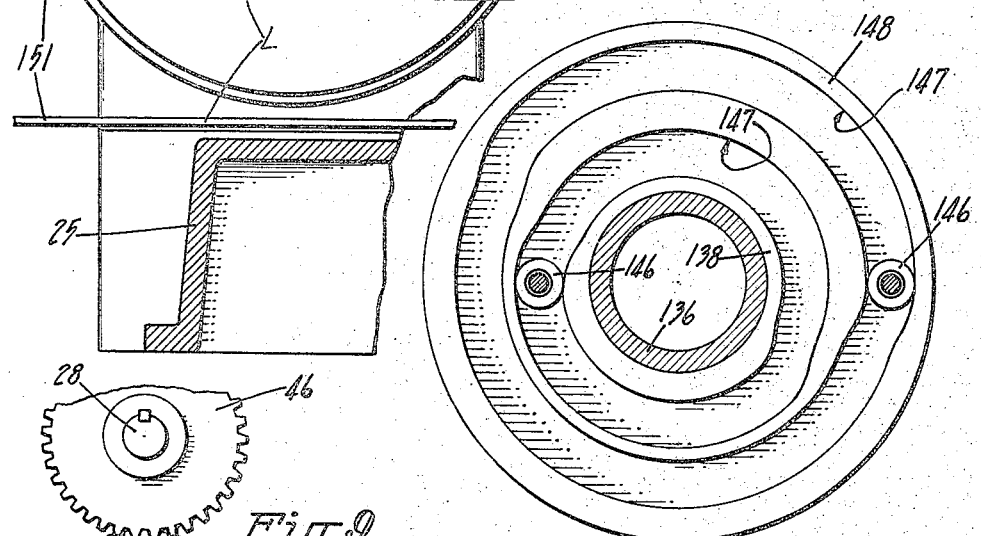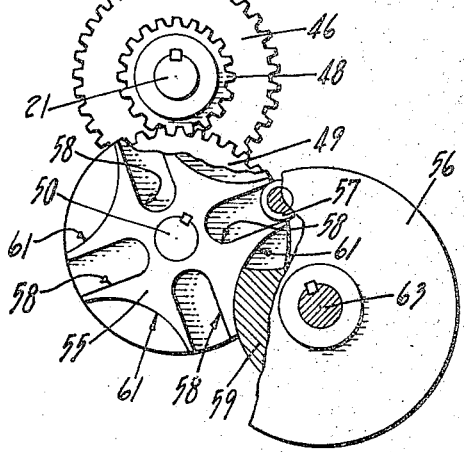

Patented Feb. 24, 1948

2,436,409

UNITED STATES PATENT OFFICE 2,436,409

MACHINE FOR MAKING CAN BODIES FROM FLATTENED TUBING

Ivan D. Thornburgh, Leonia, N. J., assignor to American Can Company, New York, N. Y., a corporation of New Jersey Application December 3, 1943, Serial No. 512,830

9 Claims. (Cl. 153—2)

The present invention relates to the manufacture of containers or cans from seamless or seamed tubing such as metallic tubing that has been flattened into double wall ribbon form and wound onto spools for convenience in shipment and storage and has particular reference to apparatus for reforming such a flattened tube by spreading apart its walls into an open condition and for cutting the opened part of the reformed tube into can body lengths as an incident to the manufacture of such cans.

An object of the invention is the provision of an apparatus for making can bodies from flattened tubular or double wall ribbon-like material such as seamless or seamed tubing which has been prepared for shipment by being flattened and wound onto spools wherein the walls of the flattened stock are spread apart or reformed into an opened tube-like shape which then is cut into can body lengths as an incident to the manufacture of the cans.

Another object of the invention is the provision of a machine of this character wherein suction devices operating upon the flattened double walls of the ribbon-like material partially open the same and condition the end for insertion of a mandrel in between the walls to further reform the material and to bring the end being worked into tubular shape whereupon a cutter cooperating with the mandrel severs a body length from the partially opened stock.

Numerous other objects and advantages of the invention will be apparent as it is better understood from the following description, which, taken in connection with the accompanying drawings, discloses a preferred embodiment thereof.

Referring to the drawings:

Fig. 2 is a longitudinal section taken substantially along the line 2—2 in Fig. 1, the view showing a flattened tube just before being partially opened, with parts broken away;

Figs. 3 and 4 are transverse sectional views taken substantially along the respective broken lines 3—3, 4—4 in Fig. 1, with parts broken away, and with Fig. 4 showing a flattened tube in position within the suction devices;

Fig. 5 is a fragmentary section showing certain of the movable parts of Fig. 4 in a different position;

Figure 1:
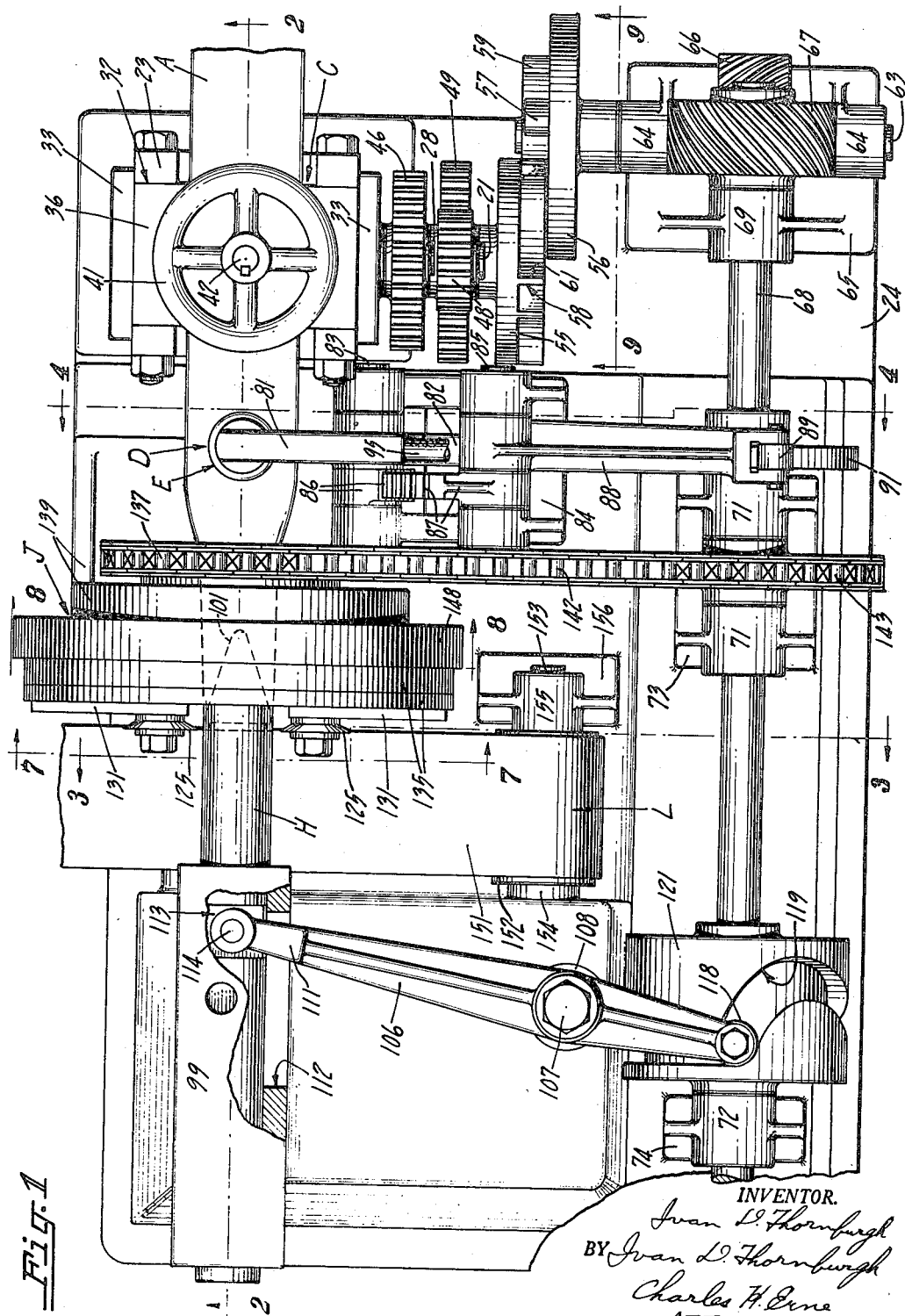
Figure 1 is a top plan view of a machine embodying the instant invention and showing a tube in place in the machine, with parts broken away.

Fig. 6 is an end elevation of the machine as viewed from the right of Fig. 1; and Figs. 7, 8 and 9 are sectional details taken substantially along the respective lines 7—7, 8—8 and 9—9 in Fig. 1.

As a preferred embodiment of the invention the drawings illustrate a machine for producing partially formed can bodies from a substantially continuous double wall ribbon of flattened seamless aluminum or similar tubing A (Figs. 1 and 2). In the machine the ribbon of tubing, in its various stages of reformation into a partially formed can body, is advanced a measured length at a time in an intermittent or step-by-step manner through a plurality of stations at which different operations are performed. This advancement of the ribbon of tubing is effected by a pair of cooperating feed rollers B (Fig. 2) which are located at a feeding station C.

A measured length of the ribbon of tubing A is first advanced into a spreading or opening station D where a pair of suction cups E, located one on each side of the ribbon, grip the flattened walls of the tubing and pull them outwardly into a partially opened tube. This operation spaces the tube walls apart and forms the opened ribbon into oblong or oval cross section, thus reforming the tubing into partially cylindrical tubular shape. In this primary opening operation the walls of the tube are spread sufficiently to impart a permanent "set" to the metal so that the walls remain in this separated condition after release by the suction cups.

After such a spreading operation the measured length of tubing is advanced one step into an idle station F and then through another step into a cutting station G. At the cutting station G the partially opened tube is further opened by a sharp nosed mandrel H, over and onto which the tube is forced as it advances into this station, the tube moving into a fully supported position on the mandrel H.

While on the mandrel H a measured length equivalent to the length of one can body is severed from the tube, the mandrel acting as a backing-up element during this cutting operation. The severing of the tube is effected by a rotary cutting device J which is located at the cutting station G. As a result of this cutting operation, a substantially cylindrical tubular can body K (Fig. 6) is produced.

After severance of the can body K from the tubing A, the mandrel H is withdrawn from the body and the latter falls to a conveyor L. The conveyor carries the received can body to any suitable place of deposit. This may mean the transfer to a subsequent operation machine in which the partially formed body is rounded up more fully and here too it may be flanged to complete the manufacture of the final can body. The discharge of the body K from the present machine, however, completes the cycle of operation of interest in the present case.

Referring now in more detail to the construction of the machine, the tube ribbon feeding rollers B are located at the feed-in or entrance end of the machine and are arranged to rotate on horizontal shafts with one roller above the other. The lower roller B is mounted on a cross shaft 21 (Figs. 1 and 6) which is journaled in a pair of spaced bearings 22 formed in an upright bracket 23 mounted on a base section 24 of a frame 25 which may constitute the main frame of the machine.

The upper roller B (Fig. 2) is maintained under spring pressure which presses it tightly against the ribbon of tubing A interposed between the rollers. This insures proper feeding of the tubing. The upper roller is mounted on a cross shaft 28 journaled in bearings 29 formed in a loose pressure block 31 carried in vertical openings 32 in the sides of the bracket 23. Side flanges 33 (see also Fig. 1) formed on the outer vertical edges of the pressure block retain the latter in place in the bracket.

The pressure block 31 is maintained under pressure of a compression spring 35 which is interposed between the top of the block and a cross bar 36 which is bolted to the top of the bracket 23. The spring is seated in recesses 37, 38 formed respectively in the pressure block and in the cross bar. It is this spring that presses the upper roller B against the ribbon of tubing A and in turn keeps the tubing in frictional engagement with the lower roller B.

At times, as when threading the leading end of a new length of tubing through the machine, it is desirable to be able to separate the upper roller B from the lower roller. This may be brought about by a hand wheel 41 which is secured to the upper end of a bolt 42 threadedly carried in the cross bar 36. The bolt extends down through the cross bar, through the spring 35, and through the top of the pressure block 31. A head 43 on the lower end of the bolt is adapted to engage the pressure block and thus lift the latter when the hand wheel is turned in the proper direction.

The feed rollers B are rotated intermittently and in unison by a pair of meshing spur gears 46 (Figs. 1 and 6) which are mounted on the cross shafts 21, 28. The lower roller shaft 21 is the driving shaft and this shaft carries a driving pinion 48 which meshes with a gear 49 mounted on a short Geneva shaft 50 (Fig. 9) carried in a bearing 51 formed on the bracket 23.

When actuated, the feed rollers B rotate through a predetermined cycle which is sufficient to advance the ribbon of tubing A through a measured distance. This measured distance is equal to the length or body height of one partially formed can body. This rotation of the feed rollers is brought about by a Geneva wheel 55 (Figs. 1, 6 and 9) which is carried on the outer end of the Geneva shaft 50. The Geneva wheel is engaged and is intermittently rotated by a Geneva disc 56 which carries a roller 57 that operates in Geneva grooves 58 formed in the Geneva wheel. Between rotations the Geneva wheel is locked against movement by a locking member 59 formed on the Geneva disc, the locking member passing into locking recesses 61 formed in the Geneva wheel. This is a conventional Geneva drive.

The Geneva disc 56 is mounted on the inner end of a disc shaft 63 which is journaled in a pair of spaced bearings 64 formed in a bracket 65 secured to the base section 24 of the main frame 25. The disc shaft is continuously rotated by a helical gear 66 which is mounted on the shaft and which meshes with a similar gear 67 carried on a main driving shaft 68. This driving shaft extends the full length of the machine and is journaled in a bearing 69 formed in the bracket 65, and in other bearings 71, 72 (Fig. 1) formed in separate brackets 73, 74 bolted to the main frame of the machine. The shaft is driven in any suitable manner.

The suction cups E used for spreading apart the walls of the ribbon of tubing A at the opening station D are carried on the inner ends of upper and lower cup arms 81, 82 (Figs. 1, 4 and 5). The upper cup arm 81 is mounted on a short pivot shaft 83 carried in a bracket 84 bolted to the main frame 25. The lower cup arm 82 is mounted on a similar pivot shaft 85 which is also carried in the bracket and in parallelism with the shaft 83.

The cup arms 81, 82 are rocked in unison and in opposite directions simultaneously thus moving together toward and away from the ribbon of tubing A. This movement brings the suction cups E into engagement with opposite sides of the tubing, as shown in Fig. 4, and spreads apart the walls of the tubing, as best shown in Fig. 5. For this purpose a pair of meshing segment gears 86, 87 are keyed onto the cup shafts 83, 85.

Rocking movement of the cup arms 81, 82 is brought about by a cup actuating arm 88 which is carried on the lower cup arm pivot shaft 85. The outer end of this actuating arm carries a cam roller 89 which operates against an edge cam 91 mounted on the main drive shaft 68. The roller is held in place against the cam by a tension spring 92. One end of this spring is hooked into a hole in the actuating arm while the opposite end is secured in a pin 93 fastened into the main frame 25.

Gripping of the ribbon of tubing A by the suction cups E is effected preferably by vacuum created in any suitable manner within the cups by way of channels 94 (Fig. 2) formed in the cup arms 81, 82. The inner ends of these channels communicate with the cups while the outer ends communicate with flexible hose connections 95 (Fig. 4) secured in the cup arms. These hose connections lead to any suitable source of vacuum.

A suitable valve may be placed in a convenient position in the line to bring the cups into communication with the source of vacuum and to break the vacuum to release the cups at the desired time. As this is a very common construction it is thought that further showing or description is unnecessary as the suction timing is not a novel feature in the instant invention.

The mandrel H on which the leading open end of the tubing A is supported while a measured length is cut off, is located in horizontal and endwise alignment with the path of travel of the tubing as it moves from stations C and D. This is best shown in Figs. 1 and 2. The mandrel preferably is cylindrical in cross section and is slidably mounted in a long bearing 99 formed on the main frame 25. Its inner end is formed with a sharp conical nose 101 to facilitate entrance into the partially opened tube and to further open the tube. Adjacent the nose the mandrel is provided with a circumferential clearance groove 102 which sets off a sharp cutting shoulder 103. This is designed for cooperation with the cutting head J in severing a body from the tube, as will be more fully explained hereinafter.

Sliding movement of the mandrel H is brought about by an actuating lever 106 (Figs. 1 and 3) which is mounted on a pivot stud 107 secured in a boss 108 formed on the main frame 25. The inner end of the actuating lever is formed with a clevis 111 which extends through a slot 112 in the mandrel bearing 99 and which operates in clearance grooves 113 formed on opposite sides of the mandrel.

The inner ends of the clevis 111 are connected to the mandrel by way of a pivot pin 114 which extends through a slot 115 formed in the mandrel. The outer end of the actuating arm 106 carries a cam roller 118. This roller operates in a cam groove 119 formed in a barrel cam 121 mounted on the main drive shaft 68.

Hence as the cam 121 rotates, it rocks the actuating lever 106 and thus reciprocates the mandrel H in its bearing 99 in time with the other moving parts of the machine. This timing, as effected by the shape of the cam groove 119, is such as to move the mandrel H inwardly in a direction toward the partially open end of the tubing A at the same time the tubing is being advanced in the opposite direction, by the feed rollers B.

The results of these two movements is that the leading, partially open end of the tube in moving from the idle station F into the cutting station G, comes into engagement with the sharp nose 101 of the inwardly moving mandrel. A telescoping action of the tube over the mandrel takes place in which a measured length of the tubing moves into a fully supported position on the mandrel. This action further spreads the walls of the tube and reforms that portion of the tube which is on the mandrel into nearly cylindrical shape.

Advancement of the tubing A stops when the feed rollers B cease rotation. At this time the leading edge of the tube is in engagement with the inner end of the mandrel bearing 99. This end of the bearing therefore serves as an additional stop by supplementing the tube advancement thus further insuring proper measurement of the tubing length to be severed. It will be evident that the mandrel H in its forward position has its cutting-off shoulder 103 a distance from the stop end of the mandrel bearing 99, equal to the length of one can body. Both mandrel and tubing remain stationary while the measured length of tubing is cut off.

The cutting device J which severs the can body K from the remainder of the tubing A includes a pair of freely rotatable cutting rollers 125 (Figs. 1, 2 and 7). Each roller is formed with a flat-sided cutting edge 126 which is adapted to cooperate with the cutting shoulder 103 of the mandrel to effect the cutting operation.

The two cutting rollers are mounted in a pair of radial slides 131 disposed on opposite sides of the path of travel of the tubing A. The slides are carried in radial slideways 132 formed on a slide disc 135 which is threadedly secured to one end of an enlarged hub 136 of a driving sprocket 137, see also Fig. 4. The hub surrounds the tubing A with sufficient clearance to prevent any interference. The hub 136 of the driving sprocket is journaled in a bearing sleeve 138 which is carried in a bracket 139 bolted to the main frame 25.

The sprocket 137 and the slide disc 135 carried thereon are continuously rotated by an endless chain 142 which is driven by a sprocket 143 mounted on the main shaft 68. This rotation of the slide disc carries the cutting rollers 125 through a circular path of travel at right angles to the longitudinal movement of the tube when coming into the cutting station G.

The mandrel H and the tube A are at rest when the cutting rollers 125 move in toward each other during their interrupted rotation around the tube. The two rollers thus approaching each other engage and cut into and through the tube, the mandrel cutting shoulder 103 acting as a backing-up element for the shearing action. It is this cutting operation that produces the partially formed can body K.

This inward movement of the cutting rollers 125 is effected by cam action. For this purpose each radial slide 131 carries a cam roller 146 (Figs. 2 and 8). Each roller operates in an independent cam groove 147 formed in a face cam 148 and this cam is shown as an integral part of the bearing sleeve 138. The cam is bolted to the bracket 139.

Upon severance of a partially formed can body K from the tube A, the cutting rollers 125 move outwardly away from the mandrel H. When the rollers are clear of the mandrel, the latter is shifted outwardly by action of its cam 121, into a retracted position within its bearing 99. This retraction of the mandrel strips the partially formed can body while it is being backed up by the stop end of the mandrel bearing. The stripped off can body K falls onto the conveyor L.

The conveyor L is located below the cutting off station G and extends transversely of the machine, as best shown in Figs. 2 and 3. This conveyor comprises an endless belt 151 which may be driven in any suitable manner in time with the other moving parts of the machine. The machine end of the belt takes over an idler pulley 152 mounted on a short pulley shaft 153 carried in a bearing 154 (see Fig. 1) formed in the main frame 25 and in a bearing 155 of a bracket 156 mounted on an adjacent portion of the main frame. It is this conveyor that carries the partially formed can body K to any suitable place of deposit.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for making can bodies from tubing that has been flattened into double walled ribbon form for convenience in shipment and storage, the combination of means for spreading apart the walls of the flattened tubing adjacent one end thereof to open the tubing, a retractable support element for receiving and supporting the opened end of the tubing, cutter devices for severing a length of said tubing while on said support element to produce a partially formed can body, and actuating means for withdrawing said support element from the severed length of said tubing to release the partially formed can body for subsequent operations.

2. In a machine for making can bodies from tubing that has been flattened into double walled ribbon form for convenience in shipment and storage, the combination of a pair of oppositely disposed suction cups engageable with the walls of the flattened tubing for spreading the walls apart adjacent one end of the tubing, a retractable mandrel for receiving and supporting the opened end of the tubing, cutter devices engageable with the spread apart walls of the tubing on said mandrel for cutting the tubing into can body lengths, and means for withdrawing said mandrel with a severed can body thereon to clear said cutter devices.

3. In a machine for making can bodies from tubing that has been flattened into double walled ribbon form for convenience in shipment and storage, the combination of a pair of cooperating feed rollers engageable against opposite walls of the flattened tubing for advancing it intermittently to measure off can body lengths, actuating devices for rotating said feed rollers, means for spreading apart the walls of the tubing adjacent the advanced end to open it, and cutter devices engageable with the spread apart walls of the tubing for cutting off the measured length of tubing to produce a partially formed can body.

4. In a machine for making can bodies from tubing that has been flattened into double walled ribbon form for convenience in shipment and storage, the combination of means for spreading apart the walls of the flattened tubing adjacent one end thereof to open the tubing, a support element for receiving and supporting the opened end of the tube, a rotatable cutter head adjacent said support element and surrounding said tube, means for rotating said head, a slide radially mounted in said head, a roller cutter mounted on said slide, and cam means operable against said slide for shifting said cutter into and out of engagement with the open end of the tube on said support element when the cutter head is rotated for encircling the opened tube and for severing a length thereof to produce a partially formed can body.

5. In a machine for making can bodies from tubing that has been flattened into double walled ribbon form for convenience in shipment and storage, the combination of means for spreading apart the walls of the flattened tubing adjacent one end thereof to open the tubing, a mandrel disposed in longitudinal alignment with said wall spreading means for receiving and supporting the opened end of the tubing, said mandrel having an annular groove therein disposed adjacent one end, said groove setting off a cutting shoulder in the mandrel, means for moving said mandrel into said tubing to position said cutting shoulder for a severing operation, a roller cutter disposed in registry with the cutting shoulder in said mandrel when so positioned for cooperation therewith in severing a length of the tube on the mandrel to produce a partially formed can body, and means for carrying said roller cutter bodily around said mandrel to effect a cutting action between said cutter and said mandrel groove.

6. In a machine for making can bodies from tubing that has been flattened into double walled ribbon form for convenience in shipment and storage, the combination of means for spreading apart the walls of the flattened tubing adjacent one end thereof to open the tubing, a retractable mandrel for receiving and supporting the opened end of the tubing, cutter devices for severing a length of said tubing while on said mandrel to produce a partially formed can body, actuating means for withdrawing said mandrel from the severed length of said tubing to release the partially formed can body for subsequent operations, and means for receiving the partially formed can body and for carrying it to a place of discharge.

7. In a machine for making can bodies from tubing which has been flattened into double walled ribbon form for convenience in shipping and storage, the combination of means for intermittently advancing the double walled flattened tubing to bring its leading end to rest in an opening station, movable means located at said station engageable with opposite exterior walls of the flattened tubing for spreading apart the walls of the tubing adjacent the leading end thereof to partially open the tubing, a support element for receiving and supporting the partially opened end of the tubing during a succeeding advancement for further separating and opening its walls, and cutter devices engageable with the spread apart walls of the tubing while the same is temporarily at rest for successively cutting the tubing into can body lengths while the tubing is held on said support element.

8. In a machine for making can bodies from tubing which has been flattened into double walled ribbon form for convenience in shipment and storage, the combination of movable means engageable with opposite exterior walls of the flattened tubing adjacent one end thereof to spread apart and partially open the tubing, a support element for receiving and further opening the partially opened end of the tubing, feeding devices for intermittently advancing said flattened tubing a distance equal to the length of one can body on each advancement, one advancement positioning the leading end of said tubing between said movable wall spreading means and a succeeding advancement placing the spread apart partially opened end of the tubing over said support element in further opened condition, and cutter devices engageable with the spread apart fully opened walls of the tubing on said support element for cutting off an advanced can body length of the tubing to produce a partially completed can body.

9. In a machine for making can bodies from tubing which has been flattened into double walled ribbon form for convenience in shipment and storage, the combination of movable means engageable with opposite exterior walls of the flattened tubing for spreading apart said walls adjacent one end of the tubing to partially open the same, a mandrel for receiving thereover and supporting the partially opened end of the tubing, said mandrel having a rounded conical tapered nose for spreading said tubing walls further apart to completely open the tubing, cutter devices engageable with the spread apart walls of the tubing for cutting the same into can body lengths, and means for moving said mandrel relative to said cutter devices and into said tubing for the described purpose preparatory to the cutting operation.

IVAN D. THORNBURGH.

REFERENCES CITED

The following references are of record in the file of this patent:

UNITED STATES PATENTS

| Number | Name | Date |
|---|---|---|
| 131,841 | Bibby et al. | Oct. 1, 1872 |
| 953,417 | Gueniffet et al. | Mar. 29, 1910 |
| 1,906,798 | Lerner | May 2, 1933 |
| 146,868 | Brooks | Jan. 27, 1874 |
| 227,462 | Whitehouse | May 11, 1880 |
| 540,881 | Sponsel | June 11, 1895 |
| 931,043 | Davis | Aug. 17, 1909 |
| 389,586 | Marshall | Sept. 18, 1888 |
| 9,782 | Muntz, Jr. | June 14, 1853 |
| 1,413,605 | Okano | Apr. 25, 1922 |
| 704,581 | Russell | July 15, 1902 |
| 1,415,099 | Kohler | May 9, 1922 |
| 1,962,166 | Yost | June 12, 1934 |
| 2,177,104 | Gonser | Oct. 24, 1939 |
| 2,254,250 | Taylor, Jr. | Sept. 2, 1941 |